(12) United States Patent
Miyabe

(10) Patent No.: US 7,821,576 B2
(45) Date of Patent: Oct. 26, 2010

(54) VIDEO FORMAT DETERMINATION USING THE HORIZONTAL SYNCHRONIZING SIGNAL

(75) Inventor: Seiji Miyabe, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1128 days.

(21) Appl. No.: 11/474,503

(22) Filed: Jun. 26, 2006

(65) Prior Publication Data

US 2006/0290816 A1    Dec. 28, 2006

(30) Foreign Application Priority Data

Jun. 27, 2005   (JP)   ............... 2005-186779

(51) Int. Cl.
- H04N 5/05     (2006.01)
- H04N 5/08     (2006.01)
- H04N 9/455    (2006.01)
- H04N 7/00     (2006.01)
- H04N 11/00    (2006.01)

(52) U.S. Cl. ............... 348/558; 348/555; 348/524; 348/525; 348/464; 348/467

(58) Field of Classification Search ............... 348/555, 348/558, 525, 524, 464, 467
See application file for complete search history.

(56) References Cited

U.S. PATENT DOCUMENTS

| | | | | |
|---|---|---|---|---|
| 5,917,552 A * | 6/1999 | Van Court | ............... | 348/558 |
| 5,963,268 A * | 10/1999 | Ko | ............... | 348/556 |
| 5,986,636 A * | 11/1999 | Wu | ............... | 345/691 |
| 6,046,737 A * | 4/2000 | Nakamura | ............... | 345/213 |
| 6,124,850 A * | 9/2000 | Matsubara | ............... | 345/204 |
| 6,130,721 A * | 10/2000 | Yoo et al. | ............... | 348/558 |
| 6,275,264 B1 * | 8/2001 | Kim | ............... | 348/525 |
| 6,329,981 B1 * | 12/2001 | Lin et al. | ............... | 345/204 |
| 6,348,931 B1 * | 2/2002 | Suga et al. | ............... | 345/699 |
| 6,606,410 B2 * | 8/2003 | Kim | ............... | 382/191 |
| 6,704,009 B2 * | 3/2004 | Tachibana et al. | ............... | 345/213 |
| 6,798,458 B1 * | 9/2004 | Unemura | ............... | 348/448 |
| 6,894,706 B1 * | 5/2005 | Ward et al. | ............... | 345/660 |
| 6,927,746 B2 * | 8/2005 | Lee et al. | ............... | 345/3.2 |
| 7,106,383 B2 * | 9/2006 | Kahn | ............... | 348/556 |
| 7,173,670 B2 * | 2/2007 | Jang | ............... | 348/558 |
| 7,333,149 B2 * | 2/2008 | Choi | ............... | 348/441 |
| 7,365,798 B2 * | 4/2008 | Nashida | ............... | 348/558 |
| 7,430,017 B2 * | 9/2008 | Lee | ............... | 348/558 |
| 7,495,681 B2 * | 2/2009 | Liu et al. | ............... | 345/698 |

(Continued)

FOREIGN PATENT DOCUMENTS

JP    2004-215004    7/2004

*Primary Examiner*—Brian Yenke
(74) *Attorney, Agent, or Firm*—Global IP Counselors, LLP

(57) ABSTRACT

An image processing device includes a synchronizing signal separation section, a counting section, a synchronizing signal determination section, and a video format determination processing section. The synchronizing signal separation section separates a horizontal synchronizing signal from a received broadcasting signal. The counting section counts the pulse number of the separated horizontal synchronizing signal. The synchronizing signal determination section determines presence/absence of a synchronizing signal based on the counted value by the counting section. The video format determination processing section determines a video format of the received broadcasting signal based on the number of scan lines. The video format determination processing section determines the video format only when it is determined that there is a synchronizing signal by the synchronizing signal determination section.

11 Claims, 5 Drawing Sheets

U.S. PATENT DOCUMENTS

| | | | |
|---|---|---|---|
| 7,532,252 B2 * | 5/2009 | Chen .......................... | 348/558 |
| 7,583,256 B2 * | 9/2009 | Park et al. .................... | 345/204 |
| 2001/0028409 A1 * | 10/2001 | Watanabe et al. ........... | 348/554 |
| 2002/0063798 A1 * | 5/2002 | Koyama ..................... | 348/554 |
| 2002/0085120 A1 * | 7/2002 | Yamaguchi et al. ......... | 348/558 |

* cited by examiner

VIDEO FORMAT DETERMINATION USING THE HORIZONTAL SYNCHRONIZING SIGNAL

CROSS-REFERENCE TO RELATED APPLICATIONS

This application claims priority to Japanese Patent Application No. 2005-186779. The entire disclosure of Japanese Patent Application No. 2005-186779 is hereby incorporated herein by reference.

BACKGROUND OF THE INVENTION

1. Field of the Invention

The present invention generally relates to an image processing device which can perform a process of determining a video format more securely and rapidly. More specifically, the present invention relates to an image processing device including a video format determination section for determining a video format of a received broadcasting signal based on the number of scan lines.

2. Background Information

Current video formats for digital broadcasting include an interlacing format with 525 scan lines (480 active scan lines) (referred to as 480i), a progressive format with 525 scan lines (480 active scan lines) (referred to as 480p), an interlacing format for digital high definition broadcasting with 1125 scan lines (1080 active scan lines) (referred to as 1080i), a progressive format for digital high definition broadcasting with 1125 scan lines (1080 active scan lines) (referred to as 1080p), and the like.

In an image processing device such as a digital broadcasting receiver which receives digital broadcasting in various types of video formats, a video format of a received digital broadcasting signal has to be determined. However, conventionally, such determination has been made by measuring a number of the scan lines within a vertical interval of the received broadcasting signal.

In such a device, the measured value for the 480p video format is 1050 and the measured value for the 1080i video format is 1125, which are very close to each other. When a noise while there is no signal, or the number of the scan lines of a received broadcasting signal with a noise is measured, the noise is also measured. This may cause a problem of erroneous determination, particularly between 480p and 1080i.

A method for determining the video format is described in, for example, Japanese Laid-Open Publication No. 2004-215004.

In this determination method, when a signal standard of a decoded video signal is 525i, the count value is 78 or 79 because a horizontal frequency is 15734 Hz, and a signal which is the count value represented in a binary number is output as a frequency signal. When the signal standard of the decoded video signal is 625i, the count value is 78 or 79 because a horizontal frequency is 15624 Hz, and a signal which is the count value represented in a binary number is output as a frequency signal. When the signal standard of the decoded video signal is 525p, the count value is 157 or 158 because a horizontal frequency is 31500 Hz, and a signal which is the count value represented in a binary number is output as a frequency signal. When the signal standard of the decoded video signal is 625p, the count value is 157 or 158 because a horizontal frequency is 31250 Hz, and a signal which is the count value represented in a binary number is output as a frequency signal. A signal determination section determines a type of the decoded signal using the seventh bit and the eighth bit from the least significant bit of the above-mentioned frequency signal represented in the binary number. The counted value according to the progressive format is twice as much as that according to the interlacing format. Thus, when the counted values are converted into the binary number, 1 and 0 of the seventh bit and the eighth bit are opposite. In this way, the video format is determined.

According to the method of Japanese Laid-Open Publication No. 2004-215004, it is possible to determine whether the video format is based on the interlacing format or the progressive format. However, there is a problem that the 480p video format and the 1080i video format cannot be distinguished.

Further, for counting the number of scan lines, the number of the scan lines may be counted repeatedly for several times until the results match each other in order to prevent the erroneous determination mentioned above. Alternatively, an up/down counting method (a processing method in which the value is added by 1 when the number matches, subtracted by 1 when the number does not match, and, finally, when the value reaches +4, for example, determination of the video format is approved) may be employed. This causes a problem because it takes too much time for the determination to be made. Accordingly, it takes too much time until the image is displayed, and the user may misunderstand that there is a problem in the device.

An object of the present invention is to solve such problems by providing an image processing device which can perform a process for determining a video format securely and rapidly by determining a presence/absence of a synchronizing signal before performing the process for determining the video format. This invention addresses this need in the art as well as other needs, which will become apparent to those skilled in the art from this disclosure.

SUMMARY OF THE INVENTION

An image processing device of the present invention is an image processing device which comprises synchronizing signal separation section, a counting section, a synchronizing signal determination section, and a video format determination processing section. The synchronizing signal separation section separates a horizontal synchronizing signal from a received broadcasting signal. The counting section counts the pulse number of the separated horizontal synchronizing signal. The synchronizing signal determination section determines a presence/absence of a synchronizing signal based on a counted value by the counting section. The video format determination processing section determines a video format of the received broadcasting signal based on a number of scan lines. The video format determination processing section determines the video format only when it is determined that there is a synchronizing signal by the synchronizing signal determination section.

By determining the presence/absence of a synchronizing signal first, a process for determining the video format can be performed with a broadcasting signal being received securely. This allows removing influence by noises and the like in the video format determination process to a significant extent. Thus, a determination process with a higher precision can be achieved.

In this example, the synchronizing signal determination section repeats continuously or with a predetermined interval a tentative determination process for obtaining a tentative determination result on a presence of the synchronization signal when a pulse number counted by the counting section during a certain period of time is within a range of a pulse number of a determination criterion which has been previously determined for each of a plurality of video formats, and finally determines the presence of the synchronizing signal only when tentative determination results are obtained consecutively for a plurality of times which has been previously set.

Specifically, when it is assumed that one video format is a progressive format with 480 active scan lines (480p), another video format is an interlacing format with 1080 active scan lines (1080i), and a certain period of time is 2 msec, for the 480p video format, since the pulse number of the horizontal synchronizing signal within a period of 2 msec is about 62 ($\cong 525 \times 60 \times 0.002$) pulses, a range from 59 to 66 pulses is set as a range of the pulse number which is a criterion for determination. For the 1080i video format, since the pulse number of the horizontal synchronizing signal within a period of 2 msec is about 67 pulses ($\cong 1125 \times 30 \times 0.002$), a range from 64 to 71 pulses is set as a range of the pulse number which is a criterion for determination. The synchronizing signal determination section finally determines that there is a synchronizing signal when the counted value of the horizontal synchronizing signal counted during a period of 2 msec is within the range of one of the determination criteria for four consecutive times, for example.

In the above example, the range of the pulse number of a determination criterion for the 480p video format and the range of the pulse number of a determination criterion for the 1080i video format partially overlap each other. Specifically, the pulse number 64, 65, and 66 are included in both of the ranges.

Thus, in the present invention, based on the determination result by the synchronizing signal determination section, the determination process is performed as described below by the video format determination processing section.

When the tentative determination results on the presence of the synchronizing signal are obtained for four consecutive times, and all of the pulse numbers counted by the counting section in a period of 2 msec in tentative determination processes are included in the overlapping range (64, 65, 66) (which means that the final determination that there is a synchronizing signal is made based on the four pulse numbers all included in the overlapping range, for example, 64 pulses for the first tentative determination, 65 pulses for the second tentative determination, again 65 pulses for the third tentative determination, and 66 pulses for the fourth tentative determination), the video format determination processing section performs a process for determining the video format using one of the following three methods.

The first method is a method of performing the process for determining the video format in a predetermined order. For example, the determination process is performed, first with respect to the 480p video format, and then, with respect to the 1080i video format.

The second method is a method of performing a determination process preferentially with respect to the video format which has been received at the last time among the 480p video format and the 1080i video format. For example, when the video format which has been received at the last time is the 1080i video format, the determination process is started from the 1080i video format. The second method is a determination process in view of a viewing tendency that it is likely to receive a broadcasting signal of a video format same as that in the last time. This allows a more rapid process for determining the video format.

The third method is a method of performing a determination process preferentially with respect to the video format which has been received more among 480p and 1080i with reference to the past reception record. For example, when the statistics of the reception record for the past one week is taken, and the 480p video format has been received for 15 times and the 1080i video format has been received for 11 times, the determination process is started from the 480p video format. The third method is a determination process in view of a viewing tendency that it is likely to receive a broadcasting signal of a video format which has been received most recently. This allows a more rapid process for determining the video format.

According to the image processing device of the present invention, a process for determining a video format can be performed securely and rapidly by determining presence/absence of a synchronizing signal before performing the process for determining the video format. An influence by noises and the like in the video format determination process can be removed to a significant extent. Thus, a determination process with a higher precision can be achieved. Further, a time taken for the determination process can be shortened compared to the method of performing the video format determination process by matching a plurality of results or using an up/down method which has been conventionally used. Since the time taken for displaying an image is shortened, a user does not misunderstand that there is a trouble in the device.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
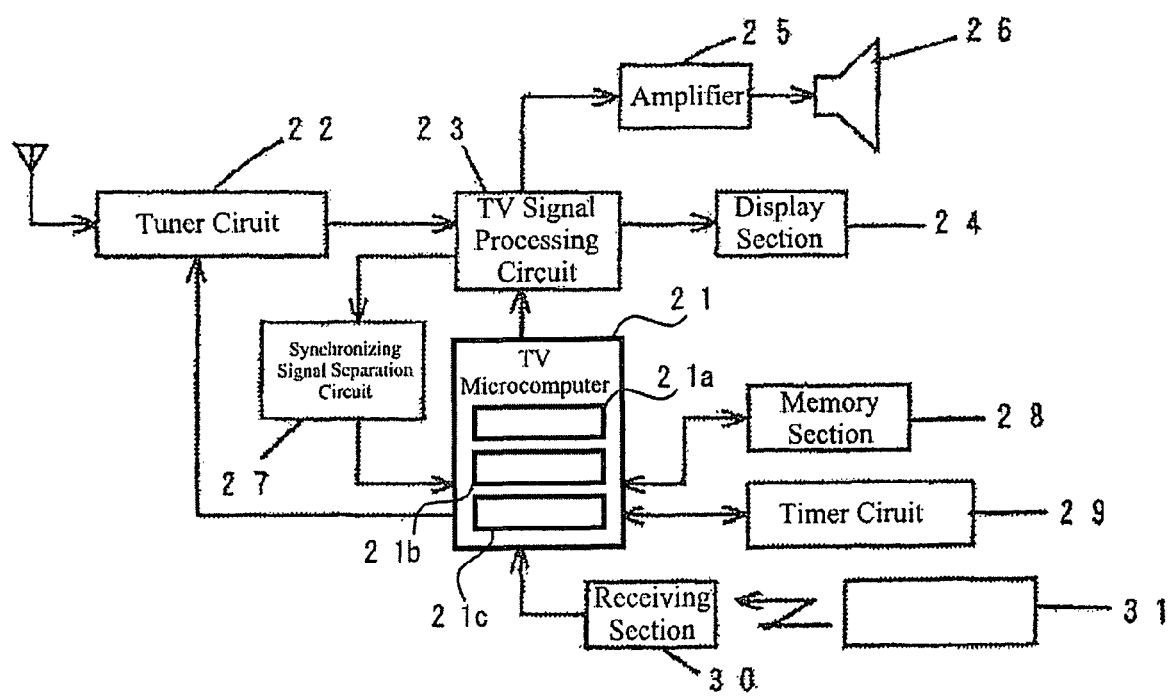
FIG. 1 is a block diagram showing an electrical structure of main parts of an image processing device according to the present invention.

FIG. 1 is a block diagram showing an electrical structure of main parts of the image processing device of the present invention. In the present embodiment, the present invention is applied to a digital television receiver.

An output from a tuner circuit 22 which receives a television broadcasting signal is connected to a TV signal processing circuit 23. An output from the TV signal processing circuit 23 is connected to a display section 24 such as a CRT, or the like. An output of an audio signal separated by the TV signal processing circuit 23 is connected to an internal speaker 26 via an amplifier 25. An output from the TV signal processing circuit 23 is connected to a synchronizing signal separation circuit 27. An output from the synchronizing signal separation circuit 27 is connected to a TV microcomputer 21.

The synchronizing signal separation circuit 27 separates a vertical synchronizing signal and a horizontal synchronizing signal from the video signal processed by the TV signal processing circuit 23 and inputs them to the TV microcomputer 21.

The TV microcomputer 21 is also connected to a memory section 28. The memory section 28 is formed of an EEPROM, flash memory or the like for storing preset values related to brightness of the display screen (preset values of brightness, contrast, color, sharpness, and the like) which have been already set at a time of shipment from the factory as default values. The memory section 28 includes a reception record storage area for storing a reception record and the like of the video formats of broadcasting signals received by the device in the past. Further, the TV microcomputer 21 is connected to a timer circuit 29 for measuring a certain period of time (for example, 2 msec or the like), which will be described below. The TV microcomputer 21 is also connected to an output of a receiving section 30 which receives various operational signals from a remote control 31. The TV microcomputer 21 is formed to perform operation control based on the various operational signals sent from the remote control 31.

The TV microcomputer 21 decodes the broadcasting signal received via a tuner circuit 22 into a video signal and/or audio signal. The TV microcomputer 21 controls the TV signal processing circuit 23 to display the video signal on the display section 24 and to output the audio signal from the internal speaker 26.

The TV microcomputer 21 further has a video format determination processing section 21a, a counting section 21b, and a synchronizing signal determination section 21c. The video format determination processing section 21a fulfills a video format determination processing function. The counting section 21b and the synchronizing signal determination section 21c fulfill a synchronizing signal determination function. The video format determination processing function is a function to determine the video format of the received broadcasting signal based on the number of scan lines within a vertical interval. The synchronizing signal determination function is a function to count a pulse number of a horizontal synchronizing signal and to determine the presence/absence of a synchronizing signal based on the counted value. Only when it is determined that there is a synchronizing signal by the synchronizing signal determination function, a process for determining the video format by the video format determination processing function will be performed.

Process for Determining Presence/Absence of a Synchronizing Signal

Figure 2:
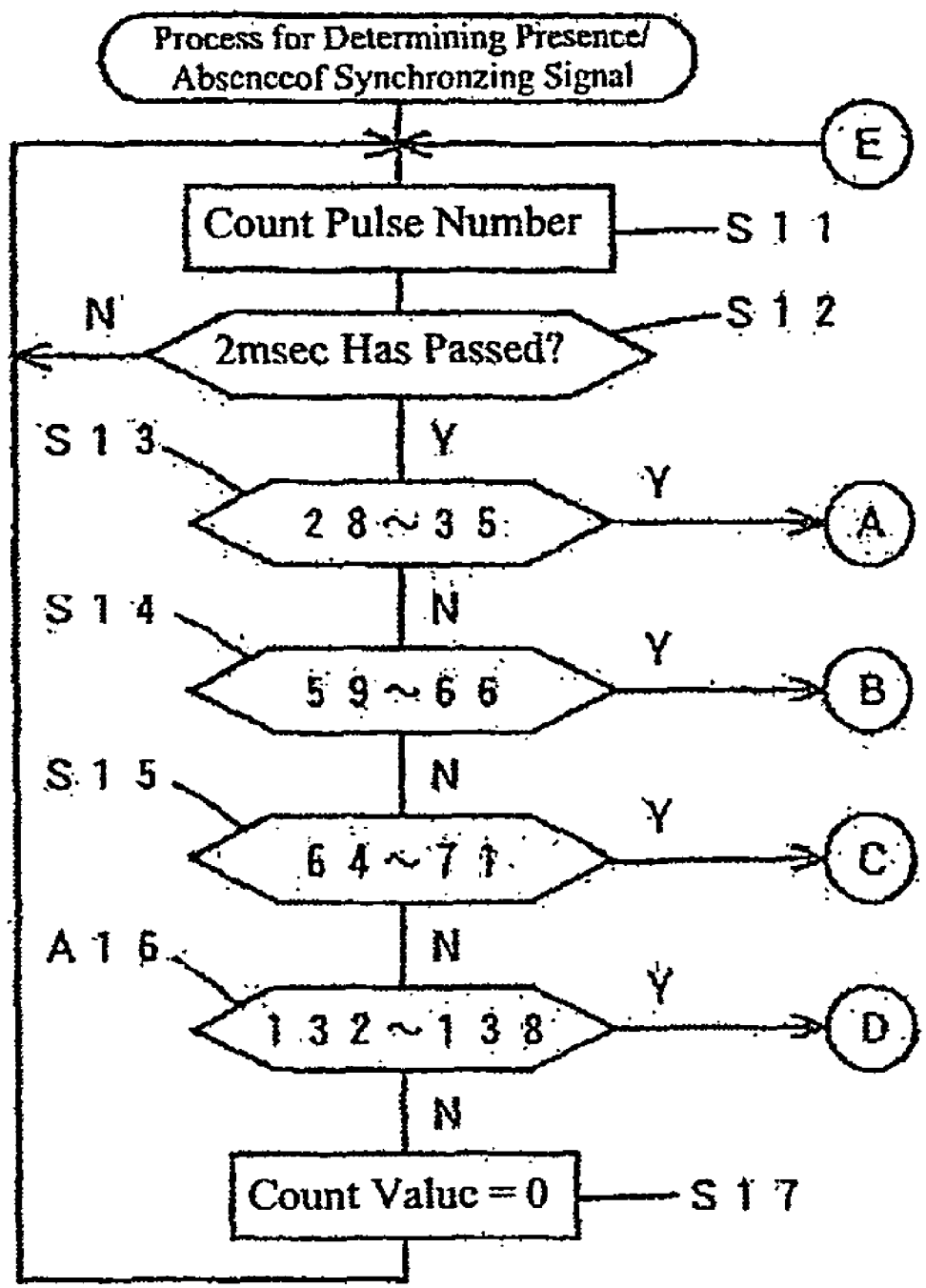
FIG. 2 is a flow diagram showing a determination process by a synchronizing signal determination function.
Figure 3:
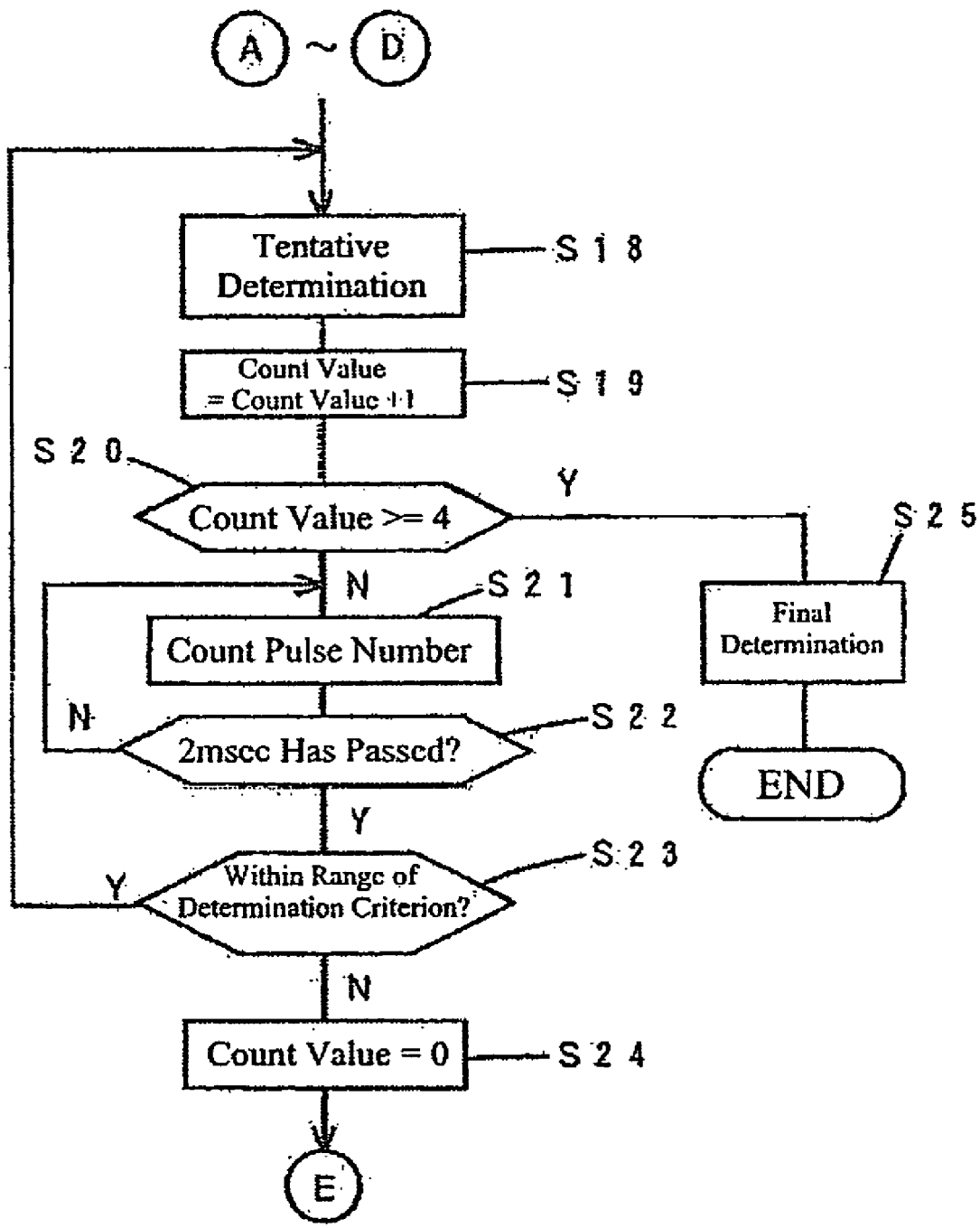
FIG. 3 is a flow diagram showing a determination process by the synchronizing signal determination function.

Next, the determination process by the synchronizing signal determination function in the image processing device having the above-described structure will be described with reference to flow diagrams shown in FIGS. 2 and 3.

As described above, the current video formats of digital broadcasting signals include a variety of video formats such as 480i, 480p, 1080i, 1080p, and the like.

It is assumed that a certain period of time which is a unit of an amount of time of measurement for counting the pulse number of the horizontal synchronizing signal is 2 msec. For the 480i video format, since the pulse number of the horizontal synchronizing signal within a period of 2 msec is about 31 ($\cong$525×30×0.002) pulses, a range from 28 to 35 pulses is set as a range of the pulse number, which is a criterion for determination. For the 480p video format, since the pulse number of the horizontal synchronizing signal within a period of 2 msec is about 62 pulses, a range from 59 to 66 pulses is set as a range of the pulse number, which is a criterion for determination. For the 1080i video format, since the pulse number of the horizontal synchronizing signal within a period of 2 msec is about 67 pulses, a range from 64 to 71 pulses is set as a range of the pulse number, which is a criterion for determination. For the 1080p video format, since the pulse number of the horizontal synchronizing signal within a period of 2 msec is about 135 ($\cong$1125×60×0.002) pulses, a range from 132 to 138 pulses is set as a range of the pulse number, which is a criterion for determination.

The synchronizing signal determination function of the TV microcomputer 21 performs a process for determining the presence/absence of the synchronizing signal based on the above conditions.

For example, when the process for determining the video format is designated by operating a button on the remote control 31 or the like, the TV microcomputer 21 first starts the process for determining presence/absence of the synchronizing signal before the process for determining the video format.

More specifically, counting of the pulse number of the horizontal synchronizing signal input from the synchronizing signal separation circuit 27 is started (step S11). The timer circuit 29 is operated to start measurement for 2 msec (step S12). The pulse number counted in the period of 2 msec is sequentially compared with the determination criterion for each of the video formats as mentioned above (steps S13 through S16). When it is determined that the counted pulse number does not satisfy any of the determination criteria (determined NO for all steps S13 through S16), the count value is cleared to zero, and the process returns to step S11 and is started again.

When the counted pulse number is within any of the range of determination criteria (YES at one of steps S13 through S16), a tentative determination that there is a synchronizing signal is made (step S18). Then, the counted value is increased by 1 (step S19), and it is determined whether the counted value reaches 4 or not at this time (step S20). If the counted value is not 4, which means that the tentative determination that there is a synchronizing signal has not been made for four consecutive times, counting of a pulse number of the horizontal synchronizing signal input from the synchronizing signal separation circuit 27 is started (step S21). The timer circuit 29 is operated to start measurement for 2 msec (step S22). The pulse number counted in the period of 2 msec is compared continuously with the determination criterion which is determined to be YES at the last time (one of steps S13 through S16) (step S23). If the counted pulse number is within the range of the determination criterion at the last time (determined YES at step S23), the process returns to step S18 and tentative determination that there is a synchronizing signal is made and the counted value is increased by 1 (step S19). Then, it is determined whether the counted value reaches four or not at this time (step S20). Such a process (process from step S18 to step S23) is repeated consecutively for three times. When the determination at step S20 becomes YES, the TV microcomputer 21 makes a final determination that there is a synchronizing signal (step S25), and finishes the process for determining presence/absence of a synchronizing signal.

On the other hand, if the determination at step S23 becomes NO while the process (process from step S18 to step S23) is being repeated, which means, when it is determined that there is no synchronizing signal before the tentative determination that there is a synchronizing signal is made for four consecutive times, the counted value is cleared to zero (step S24). The process returns to step S11, and the determination process is repeated from the beginning.

In the present invention, when the counted value of the horizontal synchronizing signal counted during a period of 2 msec is within the range of one of the determination criteria for four consecutive times, the final determination that there is a synchronizing signal is made by the synchronizing determining function.

Figure 4A:
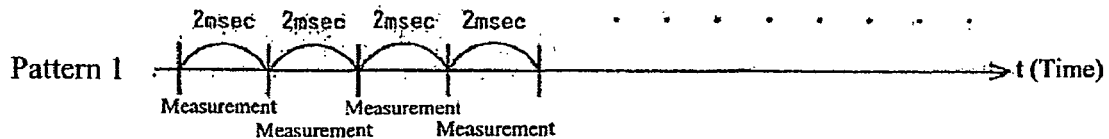
FIGS. 4A, 4B, 4C, and 4D are diagrams illustrating various patterns of timing for measuring a synchronizing signal.
Figure 4B:
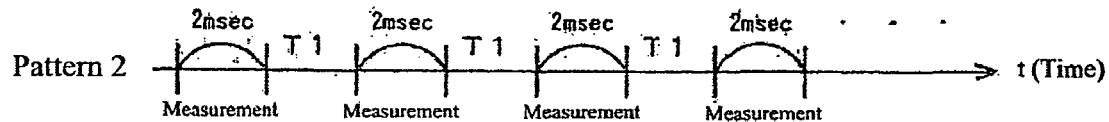
Figure 4C:
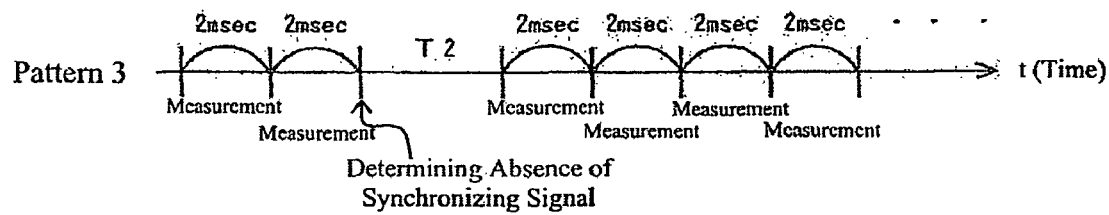
Figure 4D:
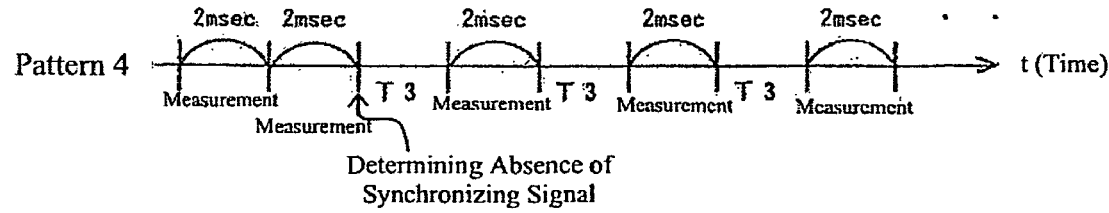

Timing for measuring the synchronizing signal may have various patterns as shown in FIGS. 4A-4D. In Pattern 1, measurements for 2 msec are repeated continuously as shown in FIG. 4A. In Pattern 2, measurements of 2 msec are sequentially performed with a certain interval T1 (for example, 10 msec or the like) as shown in FIG. 4B. In pattern 3, for example, when it is determined that there is no synchronizing signal (it is determined NO at step S23 of FIG. 3) in the second measurement while the measurements of 2 msec are repeated continuously, measurements of 2 msec are continuously repeated again after a certain interval T2 (for example, 15 msec) as shown in FIG. 4C. In Pattern 4, for example, when it is determined that there is no synchronizing signal (it is determined NO at step S23 of FIG. 3) in the second measurement while the measurements of 2 msec are repeated continuously, measurements of 2 msec are sequentially performed after a certain interval T3 (for example, 5 msec) as shown in FIG. 4C.

Process for Determining a Video Format

In the above example, the range of the pulse number of a determination criterion for the 480p video format (59 through 66) and the range of the pulse number of a determination criterion for the 1080i video format (64 through 71) partially overlap each other. Specifically, the pulse number 64, 65, and 66 are included in both of the ranges.

Thus, in the present invention, based on the result of determination on presence/absence of the synchronization signal as described above, the determination process is performed as described below in the following video format determination process function.

When the results of tentative determinations that there is a synchronizing signal are made for four consecutive times, and the pulse numbers counted in a period of 2 msec in the four tentative determination processes are all included in the overlapping range (64, 65, 66) (which means that the final determination that there is a synchronizing signal is made based on the four pulse numbers all included in the overlapping range, for example, 64 pulses for the first tentative determination, 65 pulses for the second tentative determination, again 65 pulses for the third tentative determination, and 66 pulses for the fourth tentative determination), the video format determination processing section performs a process for determining the video format using one of the following three methods.

The first method is a method of performing the process for determining the video format in a predetermined order. Specifically, the determination process is performed in a predetermined order, for example, first with respect to the 480p video format, and then, with respect to the 1080i video format.

Figure 5A:
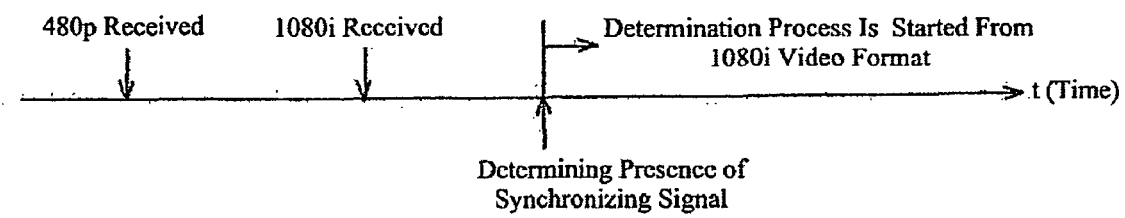
FIGS. 5A and 5B are diagrams for illustrating a second method of a video format determination process.
Figure 5B:
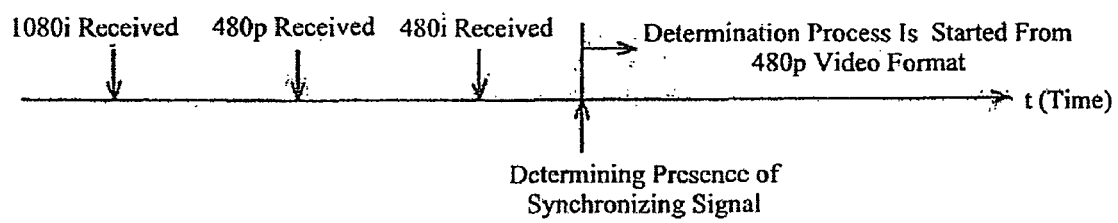

The second method is a method of performing a determination process preferentially with respect to the video format which has been received at the last time among the 480p video format and the 1080i video format. For example, as shown in FIG. 5A, when the video format which has been received at the last time is a 1080i video format, the determination process is started from the 1080i video format. For example, when the video format which has been received at the last time is a 480i video format as shown in FIG. 5B, this video format is ignored, and the 480p video format which is received before that is regarded as the video format which has been received at the last time, and the determination process is started from the 480p video format. The second method is a determination process in view of a viewing tendency that it is likely to receive a broadcasting signal of a video format same as that in the last time. This allows a more rapid process for determining the video format.

The third method is a method of performing a determination process preferentially with respect to the video format which has been received more among 480p and 1080i with reference to the past reception record. In this example, the past reception record for each of the video formats is sequentially stored in the memory section 28. For example, when the statistics of the reception record for the past one week is taken, and the 480p video format of has been received for 15 times and the 1080i video format has been received for 11 times, the determination process is started from the 480p video format. The third method is a determination process in view of a viewing tendency that it is likely to receive a broadcasting signal of a video format which has been received most recently. This allows a more rapid process for determining the video format.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Terms that are expressed as "means-plus function" in the claims should include any structure that can be utilized to carry out the function of that part of the present invention. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. An image processing device, comprising:
   a synchronizing signal separation section configured to separate a horizontal synchronizing pulses from a received broadcasting signal;

a counting section configured to count a number of the horizontal synchronizing pulses for a predetermined period that is longer than a horizontal synchronizing interval of the received broadcasting signal;

a synchronizing signal determination section configured to determine a presence/absence of a synchronizing signal based on the number of the horizontal synchronizing pulses counted by the counting section; and a video format determination processing section configured to determine a video format of the received broadcasting signal based on a number of scan lines, the video format determination processing section determining the video format only when the presence of the synchronizing signal is determined by the synchronizing signal determination section.

2. An image processing device according to claim 1, wherein the synchronizing signal determination section repeats continuously or with a predetermined interval a tentative determination process for obtaining a tentative determination result on the presence of the synchronization signal when the number of the horizontal synchronizing pulses counted by the counting section during a certain period of time is within a range of a pulse number of a determination criterion which has been previously determined for each of a plurality of video formats, and determines the presence of the synchronizing signal only when tentative determination results are obtained consecutively for a plurality of times which has been previously set.

3. An image processing device according to claim 2, wherein the range of the pulse number of the determination criterion which has been previously set in correspondence with one video format and the range of the pulse number of the determination criterion which has been previously set in correspondence with another video format partially overlap each other, and the video format determination processing section performs the determination process from one of the one video format and the another video format based on a predetermined order when the tentative determination results on the presence of the synchronizing signal are obtained consecutively for a plurality of times and the numbers counted by the counting section in the certain period of time in tentative determination processes are included in the overlapping range.

4. An image processing device according to claim 3, wherein the one video format is a progressive format with 480 active scan lines and the another video format is an interlacing format with 1080 active scan lines.

5. An image processing device, comprising:

a synchronizing signal separation section configured to separate a horizontal synchronizing signal from a received broadcasting signal;

a counting section configured to count the pulse number of the separated horizontal synchronizing signal;

a synchronizing signal determination section configured to determine a presence/absence of a synchronizing signal based on a counted value by the counting section; and a video format determination processing section configured to determine a video format of the received broadcasting signal based on a number of scan lines, the video format determination processing section determining the video format only when the presence of the synchronizing signal is determined by the synchronizing signal determination section, the synchronizing signal determination section repeating continuously or with a predetermined interval a tentative determination process for obtaining a tentative determination result on the presence of the synchronization signal when a pulse number counted by the counting section during a certain period of time is within a range of a pulse number of a determination criterion which has been previously determined for each of a plurality of video formats, and determining the presence of the synchronizing signal only when tentative determination results are obtained consecutively for a plurality of times which has been previously set, the range of the pulse number of the determination criterion which has been previously set in correspondence with one video format and the range of the pulse number of the determination criterion which has been previously set in correspondence with another video format partially overlapping each other, and the video format determination processing section performing the determination process preferentially with respect to a video format which has been received more among the one video format and another video format based on the reception record of the past when the tentative determination results on the presence of the synchronizing signal are obtained consecutively for a plurality of times and the pulse numbers counted by the counting section in the certain period of time in tentative determination processes are included in the overlapping range.

6. An image processing device according to claim 5, wherein the one video format is a progressive format with 480 active scan lines and the another video format is an interlacing format with 1080 active scan lines.

7. An image processing device according to claim 6, wherein when the certain period of time is 2 msec, the range of the pulse number which has been previously set in correspondence with the one video format is from 59 to 66 pulses, and the range of the pulse number which has been previously set in correspondence with the another video format is from 64 to 71 pulses.

8. An image processing device, comprising:

a synchronizing signal separation section configured to separate a horizontal synchronizing signal from a received broadcasting signal;

a counting section configured to count the pulse number of the separated horizontal synchronizing signal;

a synchronizing signal determination section configured to determine a presence/absence of a synchronizing signal based on a counted value by the counting section; and a video format determination processing section configured to determine a video format of the received broadcasting signal based on a number of scan lines, the video format determination processing section determining the video format only when the presence of the synchronizing signal is determined by the synchronizing signal determination section, the synchronizing signal determination section repeating continuously or with a predetermined interval a tentative determination process for obtaining a tentative determination result on the presence of the synchronization signal when a pulse number counted by the counting section during a certain period of time is within a range of a pulse number of a determination criterion which has been previously determined for each of a plurality of video formats, and determining the presence of the synchronizing signal only when tentative determination results are obtained consecutively for a plurality of times which has been previously set, the range of the pulse number of the determination criterion which has been previously set in correspondence with one video format and the range of the pulse number of the determination criterion which has been previously set in correspondence with another video format partially overlapping each other, and the video format determination processing section performing the determination process preferentially with respect to a video format which has been received latest among the one video format and the another video format when the tentative determination results on the presence of the synchronizing signal are obtained consecutively for a plurality of times and the pulse numbers counted by the counting section in the certain period of time in tentative determination processes are included in the overlapping range.

9. An image processing device according to claim 8, wherein the one video format is a progressive format with 480 active scan lines and the another video format is an interlacing format with 1080 active scan lines.

10. An image processing device according to claim 9, wherein when the certain period of time is 2 msec, the range of the pulse number which has been previously set in correspondence with the one video format is from 59 to 66 pulses, and the range of the pulse number which has been previously set in correspondence with the another video format is from 64 to 71 pulses.

11. An image processing device, comprising:

a synchronizing signal separation section configured to separate a horizontal synchronizing signal from a received broadcasting signal, a counting section configured to count the pulse number of the separated horizontal synchronizing signal;

a synchronizing signal determination section configured to determine a presence/absence of a synchronizing signal based on a counted value by the counting section; and a video format determination processing section configured to determine a video format of the received broadcasting signal based on a number of scan lines, the video format determination processing section determining the video format only when the presence of the synchronizing signal is determined by the synchronizing signal determination section, the synchronizing signal determination section repeating continuously or with a predetermined interval a tentative determination process for obtaining a tentative determination result on the presence of the synchronization signal when a pulse number counted by the counting section during a certain period of time is within a range of a pulse number of a determination criterion which has been previously determined for each of a plurality of video formats, and determining the presence of the synchronizing signal only when tentative determination results are obtained consecutively for a plurality of times which has been previously set, the range of the pulse number of the determination criterion which has been previously set in correspondence with one video format and the range of the pulse number of the determination criterion which has been previously set in correspondence with another video format partially overlapping each other, and the video format determination processing section performing the determination process from one of the one video format and the another video format based on a predetermined order when the tentative determination results on the presence of the synchronizing signal are obtained consecutively for a plurality of times and the pulse numbers counted by the counting section in the certain period of time in tentative determination processes are included in the overlapping range, when the certain period of time is 2 msec, the range of the pulse number which has been previously set in correspondence with the one video format being from 59 to 66 pulses, and the range of the pulse number which has been previously set in correspondence with the another video format being from 64 to 71 pulses.

* * * * *